(12) United States Patent
Jha et al.

(10) Patent No.: US 8,834,600 B2
(45) Date of Patent: Sep. 16, 2014

(54) EXTRACTION PROCESS FOR REACTIVE METAL OXIDES

(75) Inventors: Animesh Jha, Leeds (GB); Pailo Antony Malpan, Kalpakkam (IN); Vilas Dattatray Tathavadkar, Phaltan (IN)

(73) Assignee: The University of Leeds, Leeds (GB)

( * ) Notice: Subject to any disclaimer, the term of this patent is extended or adjusted under 35 U.S.C. 154(b) by 1660 days.

(21) Appl. No.: 10/560,515

(22) PCT Filed: Jun. 11, 2004

(86) PCT No.: PCT/GB2004/002543
§ 371 (c)(1),
(2), (4) Date: Aug. 17, 2007

(87) PCT Pub. No.: WO2004/113230
PCT Pub. Date: Dec. 29, 2004

(65) Prior Publication Data
US 2009/0311154 A1 Dec. 17, 2009

(30) Foreign Application Priority Data
Jun. 16, 2003 (GB) .................................. 0313886.4

(51) Int. Cl.
*C22B 9/00* (2006.01)
*B22D 11/10* (2006.01)
(Continued)

(52) U.S. Cl.
CPC ......... *C22B 34/1236* (2013.01); *C22B 21/0038* (2013.01); *C22B 34/1259* (2013.01); *C22B 34/1209* (2013.01); *C01G 49/06* (2013.01); *C01G 23/047* (2013.01); *C22B 7/04* (2013.01); *C22B 1/02* (2013.01); *C01F 7/38* (2013.01); *C01F 7/142* (2013.01); *C22B 5/10* (2013.01)
USPC .................. 75/507; 75/584; 75/582; 75/571; 75/506; 75/500; 75/435; 75/434; 75/414; 75/392; 423/633; 423/632; 423/625; 423/624; 423/610; 423/608; 423/592.1; 423/335; 423/325; 423/324

(58) Field of Classification Search
None
See application file for complete search history.

(56) References Cited

U.S. PATENT DOCUMENTS

| 1,911,396 A | 5/1933 | Holbert et al. |
| 2,109,917 A | 3/1938 | Dunn |

(Continued)

FOREIGN PATENT DOCUMENTS

| FR | 1053383 | 2/1954 |
| GB | 848230 | 9/1960 |

(Continued)

OTHER PUBLICATIONS

International Search Report dated Sep. 14, 2004.

*Primary Examiner* — Yoshitoshi Takeuchi
(74) *Attorney, Agent, or Firm* — Dunlap Codding, P.C.

(57) ABSTRACT

The present invention relates to a zero-waste process for extraction of alumina from different types of bauxite ores and red mud residues and of titanium dioxide from ilmenite. Iron oxide is first reduced to metallic iron above the melting point of C-saturated cast iron alloy which yields a high-C iron alloy and an Al and Ti metal oxide rich slag which is then treated with alkali carbonate to form alkali aluminates and titanates. The alkali aluminates are separated by water leaching from which the hydroxide of alumina is precipitated by bubbling $CO_2$. The residue from water leaching is treated with sulphuric acid and $TiO_2$ is precipitated via a hydrolysis route. The process recovers most of the metal values and generates only small quantities of silicious residues at pH 4-5 which can be used for soil conditioning. The present also relates to a method for selective separation of $TiO_2$-rich oxides from titaniferrous ore/residue materials via oxidative roasting in the presence of alkali carbonate or carbonates followed by aqueous leaching of the roasted material and selective precipitation of $TiO_2$ under controlled condition below pH=4.

18 Claims, 3 Drawing Sheets

(51) Int. Cl.
*C21B 7/14* (2006.01)
*C21B 15/00* (2006.01)
*C21B 3/04* (2006.01)
*C22B 5/20* (2006.01)
*C22B 11/10* (2006.01)
*C21B 11/10* (2006.01)
*C01G 49/02* (2006.01)
*C01F 7/02* (2006.01)
*C01G 15/00* (2006.01)
*C01F 3/00* (2006.01)
*C01G 23/047* (2006.01)
*C01G 27/02* (2006.01)
*C01G 25/02* (2006.01)
*C01B 13/14* (2006.01)
*C01B 33/12* (2006.01)
*C01B 33/20* (2006.01)
*C01B 15/14* (2006.01)
*C01B 33/00* (2006.01)
*C22B 21/00* (2006.01)
*C22B 34/12* (2006.01)
*C01G 49/06* (2006.01)
*C22B 7/04* (2006.01)
*C22B 1/02* (2006.01)
*C01F 7/38* (2006.01)
*C01F 7/14* (2006.01)
*C22B 5/10* (2006.01)

(56) References Cited

U.S. PATENT DOCUMENTS

| | | | |
|---|---|---|---|
| 3,733,193 A | | 5/1973 | Dresher et al. |
| 3,876,749 A | * | 4/1975 | Horvath et al. ............ 75/500 |
| 3,989,513 A | | 11/1976 | Horvath et al. |
| 4,038,363 A | | 7/1977 | Jarish |
| 5,085,837 A | | 2/1992 | Chao et al. |
| 5,411,574 A | | 5/1995 | Turney et al. |
| 5,527,469 A | | 6/1996 | Lawhorne et al. |
| 6,346,223 B2 | | 2/2002 | De Matos et al. |
| 6,471,743 B1 | | 10/2002 | Young et al. |
| 2001/0007646 A1 | | 7/2001 | Lakshmanan et al. |

FOREIGN PATENT DOCUMENTS

| | | | |
|---|---|---|---|
| JP | 2002-317230 | | 10/2002 |
| WO | WO 02/10068 | * | 2/2002 |
| WO | WO 02/10068 A1 | | 2/2002 |

* cited by examiner

EXTRACTION PROCESS FOR REACTIVE METAL OXIDES

RELATED APPLICATIONS

This application claims the benefit of priority to Patent Cooperation Treaty Application number PCT/GB2004/002543, filed Jun. 11, 2004; which claims the benefit of priority to Great Britain Patent Application serial number 0313886.4, filed Jun. 16, 2003. The entirety of each of them is hereby incorporated by reference.

The present invention relates to a process for recovering a metal oxide from a titania-rich and/or alumina-rich mixture and to a method for recovering titanium dioxide from a titanium dioxide-containing composition.

Existing processes for extraction of alumina and $TiO_2$ generates large amounts of hazardous waste which is disposed in landfills. The management of landfill sites is a major problem due to increasingly stringent environmental regulations.

The Bayer process used for the extraction of alumina from bauxite ores is well documented (*Technology Roadmap for Bauxite Residue Treatment and Utilisation*, February 2000, The Aluminum Association see http://www.aluminum.org; Ed. Fathi Habashi, *Hand Book of Extractive Metallurgy*, Vol. II, Publ: Wiley-VCH, Berlin, 1997; Adamson et al, *Basic Principles of Bayer Process Design, Extractive Metallurgy of Aluminium*, Vol. I, Publ.: Interscience, New York, 1963; Kirk-Othmer, Encyclopaedia of Chemical Technology, Vol. 1, $4^{th}$ edition, John Wiley, New York, (1991-98); and Crockett, *Bauxite, Alumina and Aluminium*, Publ.: H.M.S.O., London, (1978)). The Bayer process generates large amounts of highly alkaline residue known as red mud. The disposal of large volumes of red mud has become a major issue. The percolation of alkaline leachate into surface and ground water and dry dust from improperly maintained landfill sites create severe environmental concerns. In nations where the environmental regulations are strict, the total cost of red mud disposal could be as much as $5 per tonne which may be at least 5% of the current sale price of alumina. The optimum extraction efficiency of alumina from the most suitable bauxite deposits and concentrates varies between 55% and 60% which means that at least 45% of alumina remains locked in the Bayer process residue.

Various techniques have been developed for the recovery of alkali, alumina, $Fe/Fe_2O_3$, $TiO_2$, $SiO_2$ and other materials from red mud and for manufacturing bricks and refractories (Thakur et al, *Red Mud Analysis and Utilization*, Publ: Wiley Eastern Limited, New Delhi, 1994; U.S. Pat. No. 6,248,302, U.S. Pat. No. 5,106,797; U.S. Pat. No. 4,668,485; and U.S. Pat. No. 3,989,513). However, most of these techniques are uneconomical and not used commercially. In most alumina industries, the common practice for red mud disposal is deep thickening to recover alumina and soda followed by wet-slurry or dry storage (www.alcoa.com.au/environment/bauxiter.shtml; www.former.alcan.com/Environment.nsf/Sub-Topics-E/raw?OpenDocument) Wherever possible, red mud is also disposed at sea or in river basins. However this practice is gradually being curtailed due to the long-term effects on marine ecology. Dry storage has several advantages over wet slurry storage but it needs initial high investment. In the dry storage method, after deep thickening, the slurry is solar dried in specially designed ponds. When full, the sites are capped, the land is restored for other usage and a follow-up monitoring program is put in place to ensure environmental compatibility.

Work on the reduction of iron oxides using natural gas via smelting has also been carried out. However iron separation still remains a major problem for the recovery of titanium dioxide (Thakur [supra]; and Srikanth et al; TMS $130^{th}$ Annual meeting and conference, New Orleans, USA, Feb. 11-15, 2001).

Ilmenite ore is the major source of Ti metal and $TiO_2$. It accounts for 90% of the world's Ti deposit with the remaining 10% occurring naturally as $TiO_2$ (known as rutile). $TiO_2$ itself is an important mineral used as a pigment (particularly in paints, coatings, paper, printing inks, synthetic fibres and pharmaceuticals), and in glass and glass ceramics manufacture, electro-ceramics and welding fluxes. The presence of iron oxides in ilmenite contribute to the waste and to the pigment quality.

At present, ilmenite ($FeO.TiO_2$) is transformed into synthetic rutile by either chemical or thermal methods (Ed. Fathi Habashi, *Hand Book of Extractive Metallurgy*, Vol. II, Publ: Wiley-VCH, Berlin, 1997). Iron can be leached from ilmenite using hydrochloric or sulphuric acid leaving behind 90-96% synthetic rutile. The leachate waste is disposed of either in a pond or into the sea leading to a major loss of iron. In a carbothermic reduction process, ilmenite is reduced in an electric-arc furnace at around 1650° C. to produce Fe metal in the form of pig iron and $TiO_2$-containing slag. Some FeO is deliberately left in the slag in order to reduce the melting point. The $TiO_2$ content of the slag may vary depending on the mineralogy of the ore between 65 and 80%. A high-temperature chlorination and oxidation step or leaching with sulphuric acid (for low-grade slag) is then required to produce high quality $TiO_2$ (U.S. Pat. No. 5,068,093; U.S. Pat. No. 5,997,606; and U.S. Pat. No. 6,090,354). High quality $TiO_2$ is also produced from rutile. Chlorination of the rutile is used to produce $TiCl_4$, which is then oxidised to produce $TiO_2$. In view of the environmental concerns in relation to the use of substances such as hydrochloric and sulphuric acid and the disposal of copious amounts of acid waste produced by these processes, it is essential that a new, more environmentally acceptable approach for the extraction of $TiO_2$ be developed.

There has been a limited number of unsuccessful laboratory-scale investigations on the roasting of ilmenite with soda in a reducing atmosphere with carbon. However the yield of $TiO_2$ was less than 50 percent. The major drawback with this process is that neither is iron separated in the metallic form nor is a leachable product produced (Ed. Fathi Habashi, *Hand Book of Extractive Metallurgy*, Vol. II, Publ: Wiley-VCH, Berlin, 1997). The reduction of ilmenite for making iron and $TiO_2$ has also been studied extensively. However the extraction of $TiO_2$ from reduced ore exhibits disadvantageously a fine distribution of Ti-oxycarbide and oxide phases (Srinkath [supra]).

The present invention seeks to improve the recovery of a metal oxide from a ferrous mixture by separating out a substantial proportion of iron before isolating the metal oxide.

Thus viewed from one aspect the present invention provides a process for recovering at least one metal oxide from a titaniferrous or aluminaferrous mixture comprising:

(A) smelting the mixture in the presence of a reducing agent to produce a molten slag;
(B) adding to the molten slag an alkali;
(C) isolating molten iron from the molten slag to produce a residual slag; and
(D) recovering the metal oxide from the residual slag.

By a "titaniferrous mixture" is meant a mixture of metal oxide species in compound form or forms which include titania ($TiO_2$) and at least one iron species such as a ferrous or ferric species (preferably an iron oxide such as FeO, $Fe_2O_3$ or $Fe_3O_4$). The titaniferrous mixture may be synthetic or (preferably) natural such as a powder, ore or mineral. Preferred is a titanium rich material such as a titaniferrous mineral or ore (eg ilmenite, ilmenite beach sands, natural rutile or perovskite). Preferably the titaniferrous mixture further comprises alumina. Preferably the titaniferrous mixture further comprises silica.

By an "aluminaferrous mixture" is meant a mixture of metal species (eg metal elements, compounds or alloys) which include alumina ($Al_2O_3$) and at least one iron species such as a ferrous or ferric species (preferably an iron oxide such as FeO, $Fe_2O_3$ or $Fe_3O_4$) and a metal oxide to be recovered. The aluminaferrous mixture may be synthetic or (preferably) natural such as a powder, ore or mineral. A preferred aluminaferrous mixture is an aluminium rich mixture such as an aluminium mineral or ore (eg bauxite) or red mud (or a mixture of bauxite and red mud). Preferably the aluminaferrous mixture further comprises titania. Preferably the aluminaferrous mixture further comprises silica.

The process of the invention provides a complete, efficient and economic recovery of metal oxide whilst alleviating the environmental concerns associated with existing processes. The process may be advantageously a substantially zero-waste process.

In an embodiment of the invention, the metal oxide is one or more of alumina, $TiO_2$, $Fe_2O_3$ and $SiO_2$.

An embodiment of the invention further comprises: recovering one or more metal hydroxides.

In an embodiment of the process, the at least one metal oxide is at least two metal oxides (preferably $TiO_2$ and $Al_2O_3$).

In step (A), a major proportion (preferably up to 75 wt % such as 70-75 wt %) of the iron (eg iron oxide) present in the titaniferrous or aluminaferrous mixture may be reduced to molten metallic iron in the molten slag.

Preferably the metallic iron is steel (eg high carbon steel). For this purpose, the reducing agent preferably comprises (or is) molten cast iron and step (A) is preferably carried out in a molten cast iron bath. The carbon and silicon inherent in the molten cast iron act as reducing agents to produce a molten slag (which contains predominantly gangue mineral oxides such as $SiO_2$) as shown for example in equations 1 and 2:

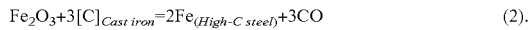

Dependent on the precise composition of the titaniferrous or aluminaferrous mixture, step (A) may advantageously transform iron into a high-carbon steel without increasing the need for additional energy consumption since reactions (1) and (2) and the combustion of evolved CO are exothermic with a total ΔH of −305 Kcal/mole. Preferably the metallic iron is 0.8 to 1.0% C steel. This may be derived from 4 to 4.5% C in cast iron and allows the melting temperature of high-C steel to be maintained at around 1475° C. during step (A) at which the slag also remains molten. Although the carbon content in the steel may be reduced, additional energy is then required for maintaining the temperature of the liquid metal.

In a preferred embodiment, the reducing agent comprises: a source of carbon. The source of carbon may be solid carbon, graphite, fine coal or coke breeze. When the process is performed in the presence of molten cast iron in a bath, the source of carbon advantageously assists reactions (1) and (2) to reach equilibrium.

In a preferred embodiment, step (A) comprises smelting the mixture in the presence of a reducing agent and lime (ie CaO or $Ca(OH)_2$). As shown in equation (6) below, the addition of lime advantageously locks the silica formed via reaction (1) and any present in the mixture so as to reduce the consumption of alkali in forming alkali silicates in step (B). Excess silica can be fixed in this manner for example by the addition of an equivalent proportion of lime in the sodium alumino-silicate slag. The presence of $SiO_2$ aids the separation of $TiO_2$ in step (D) (eg during water quenching). However, an excess amount of lime aids preferential partitioning of alumina between sodium aluminate and calcium alumino-silicate. The formation of calcium aluminosilicate slag is not desirable for complete extraction of alumina. The addition of CaO changes the chemical association of alumina with silica to sodium oxide by forming sodium aluminate, whereas the $TiO_2$ remains disproportioned in the pure form (ie $TiO_2$ saturated slag) and in the calcium silicate phase.

Where the aluminaferrous mixture is bauxite or red mud, lime and excess carbon is preferably mixed therein and charged into a molten cast iron bath in step (A). Where the titaniferrous mixture is ilmenite, the ore is charged in step (A) into a cast iron bath for promoting the reduction of iron oxides by carbon and silicon present in the molten cast iron.

In step (B), the alkali may be added in an amount of up to 50% excess of the stoichiometric proportion to the molten slag. Preferred alkalis are one or more oxides, hydroxides, carbonates, bicarbonates or hydrogen carbonates (particularly preferably carbonates). The carbonate may be a carbonate of a group Ia or IIa metal or a mixture thereof. Preferably the carbonate is selected from the group consisting of sodium carbonate (soda) and potassium carbonate (potash). In a preferred embodiment (eg where the aluminaferrous mixture is bauxite or red mud), the carbonate may be added to the smelt at a temperature in excess of 1500° C. The carbonate enhances slag fluidity and facilitates a better separation of metal. In the case of titanium dioxide, the carbonate may be added to the smelt at a temperature below 900° C. forming sodium titanate phases and sodium aluminate phases.

By way of example, the reaction between the refractory oxides and alkali carbonates forms aluminates, silicates and titanates as shown in equations (3) to (5):

Where the titaniferrous mixture is ilmenite, step (A) may comprise smelting the mixture in the presence of up to 50% by stoichiometric proportion of an alkali/alumina mixture or sodium aluminate. This promotes the formation of sodium aluminate in the slag which then has a much lower melting point than either pure $TiO_2$ or $FeO.TiO_2$ slag. The sodium aluminate slag is also a very good sink for any remaining unreduced iron oxide and silica.

In step (C), the molten iron (eg steel) and residual slag are preferably tapped separately. Preferably during tapping of residual slag, alkali is added. Preferably alkali is added by dosing. This advantageously converts any unreacted $Al_2O_3$ and $TiO_2$ into aluminates and titanates, whilst minimizing the risk of alkali attack on refractory lining.

In a preferred embodiment, step (D) comprises:
(D1) adding to the residual slag an aqueous solution;
(D2) separating a metallate solution from a metallate residue; and
(D3) isolating the metal oxide from the metallate solution and/or from the metallate residue.

The aqueous solution may be water or a dilute ammoniacal solution. The aqueous solution may be at an elevated temperature. The metallate solution may be an aluminate solution. The metallate residue may comprise titanates and/or silicates.

Step (D2) may be carried out by filtration. The metallate residue may be washed thoroughly to recover all the metallate solution and alkali.

In an embodiment, step (D3) may comprise:
(D3a) precipitating metal hydroxide from the metallate solution Step (D3a) may be performed by the addition of an acid. Typically the acid is an inorganic acid (eg an inorganic acid selected from the group consisting of hydrofluoric acid, hydrochloric acid, nitric acid, sulphuric acid, an acidic oxide and mixtures thereof). Preferably the acid is an acidic oxide, particularly preferably carbon dioxide. For example, step (D3a) may include: bubbling $CO_2$ gas through (or passing oxalic acid into) the metallate solution. Preferably the $CO_2$ gas is generated during step (A).

The metal hydroxide precipitate is washed thoroughly. Aluminium hydroxide formed in step (D3a) may be calcined to produce alumina.

In an embodiment, step (D3) may comprise:
(D3b) acid leaching the metallate residue to produce an acid leachate;
(D3c) selectively precipitating from the acid leachate a hydrated salt of the metal oxide; and
(D3d) converting the hydrated salt into the metal oxide.

Step (D3b) may comprise:
(D3b1) acidifying the metallate residue to produce a slurry;
(D3b2) hydrolysing the slurry; and
(D3b3) separating out an insoluble residue.

The metallate residue may be digested in acid (eg sulphuric acid) in step (D3b1) and filtered in step (D3b3) to separate out insoluble residue (eg silicates). In accordance with practices familiar to those skilled in the art, the pH may be adjusted to 1 followed by hydrolysis of the filtered solution to yield hydrated titanium oxide in step (D3c). The filtered and washed precipitate may be calcined (in step D3d) to produce pigment grade $TiO_2$. The filtered solution may be recycled in an acid digestion step.

The insoluble residue consists mainly of silicates and has a pH of 5-6. This can be neutralized to pH7 and usefully disposed as a soil conditioner containing $K^+$ ions.

The wastewater and filtered solution from various stages of the embodiments of the invention can be treated with $CO_2$ gas (generated during step (A) and (B)) to recover alkali carbonate, which can be then recycled into step (B).

The present invention further seeks to provide an improved route for extraction of $TiO_2$ from ilmenite and other sources of titanium oxide.

Viewed from a further aspect the present invention provides a method for recovering titanium dioxide from a titanium oxide-containing composition comprising:
(a) roasting the composition in the presence of an alkali metal carbonate and an alumina-containing material to produce a roasted mass; and
(b) recovering titanium oxide from the roasted mass.

The method of the invention substantially reduces the amount of waste.

The titanium oxide-containing composition may be synthetic or (preferably) natural such as a powder, ore or mineral. Preferred is a titanium oxide-containing mineral (eg ilmenite, natural rutile or perovskite).

The alkali metal carbonate may be sodium and/or potassium carbonate. The amount of alkali metal carbonate may be calculated based on the formation of alkali metal titanates and alkali metal aluminates. For better extraction efficiency up to 50% excess alkali carbonate to stoichiometric ratio is used.

The alumina-containing material may be alumina which is typically present in step (a) in an amount of 10-30 wt %. An aluminate (eg $NaAlO_2$) may also be used.

Step (a) may be carried out at a temperature in the range 800 to 1250° C. Preferably step (a) is carried out below 900° C. to reduce formation of complex alkali titanates which are difficult to separate out in aqueous, alkali or acid medium.

Step (b) may comprise:
(b1) adding to the roasted mass an aqueous medium to produce an aqueous solution and an insoluble residue.

The aqueous medium may be water. Typically water is used at an elevated temperature (eg hot water).

The method may further comprise:
(b2) acid leaching the insoluble residue to produce an acid leachate; and
(b3) recovering titanium oxide from the acid leachate.

The insoluble residue may be acid leached with an acid solution (such as a 5-20 wt % mineral acid (eg $HCl/H_2SO_4$) solution) to remove iron compounds and decompose sodium titanates into $TiO_2$. Dissolved iron may be separated by adjusting the pH of the solution. The filtered and washed residue may consist of 90-95% $TiO_2$. Further purification of the $TiO_2$ may be carried out. For example, further purification may be carried out by low temperature roasting with alkali hydrogen sulphate or by electrolytic purification techniques.

In a preferred embodiment, the method further comprises:
(c) recovering alumina-containing material (preferably alumina) from the aqueous solution.

Step (c) may be performed by the addition of an acid. Typically the acid is an inorganic acid (eg an inorganic acid selected from the group consisting of hydrofluoric acid, hydrochloric acid, nitric acid, sulphuric acid, an acidic oxide and mixtures thereof). Preferably the acid is an acidic oxide, particularly preferably carbon dioxide. For example, step (c) may include: bubbling $CO_2$ gas through (or passing oxalic acid into) the aqueous solution. Preferably the $CO_2$ gas is generated during step (a).

In a preferred embodiment, the method further comprises:
(d) recovering carbon dioxide generated in step (a);
(e) converting the carbon dioxide into an alkali metal carbonate.

The alumina-containing material (eg alumina) and/or alkali metal carbonate recovered in steps (c)-(e) may be recycled advantageously which make these embodiments economically viable. Regenerating carbonates makes the method environmentally safe and reduces the emission of greenhouse gas $CO_2$.

The present invention will now be described in a non-limitative sense with reference to the accompanying Examples and Figures in which.

EXAMPLE I

Bauxite Ore from Ghana

Figure 1A:
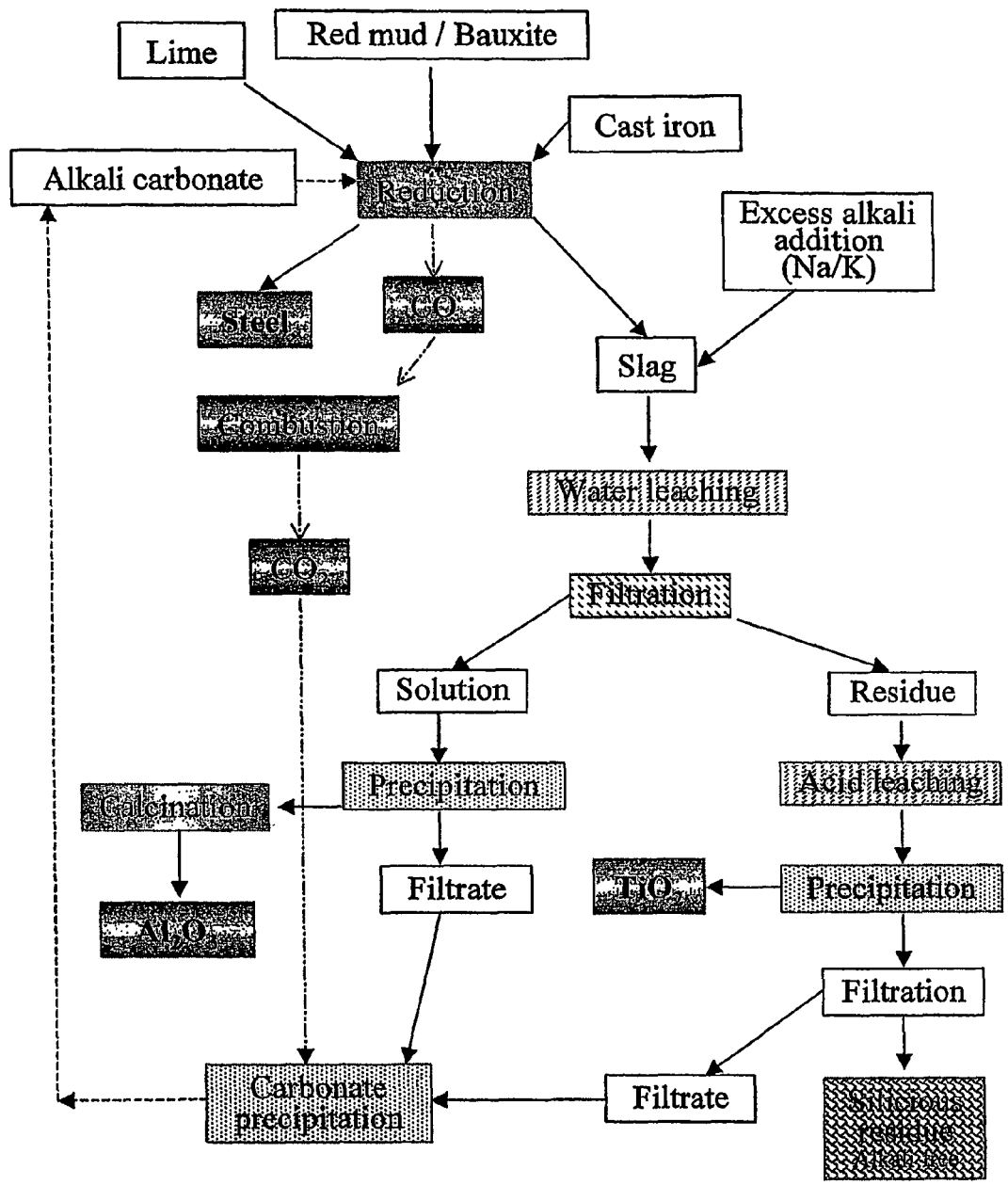
FIG. 1a illustrates schematically the process carried out in Examples I and II.

FIG. 1a illustrates schematically the process carried out in Example 1.

Gray cast iron with 1% Si and 4.2% carbon was melted in an induction furnace. Bauxite ore from Ghana (approximate composition: 55% $Al_2O_3$, 12% $Fe_2O_3$, 2% $TiO_2$, 2% $SiO_2$ and moisture) was mixed homogeneously with lime and excess carbon and was added slowly to the molten bath. The temperature of the bath was adjusted to maintain the metal containing slag in a molten condition.

Sodium or potassium carbonate was added (20% excess to stoichiometric ratio) at the end of reduction and fluid slag was tapped. The slag was digested in hot water and filtered. The filtrate was acidified with carbon dioxide to convert water-soluble sodium/potassium aluminate into an $Al(OH)_3$ precipitate. $Al(OH)_3$ was filtered out and calcined to produce pure $Al_2O_3$. The extraction efficiency of alumina was nearly 65%. Remaining alumina formed complex alumino-silicates. The filtrate was evaporated and sodium carbonate was recovered.

The residue containing titanium dioxide ($TiO_2$) was mixed with 98% $H_2SO_4$ to make a slurry. The ratio of $H_2SO_4$ to residue was chosen in such a way that the weight ratio of $H_2SO_4$ to $TiO_2$ in the suspension produced by hydrolysis was maintained between 2 to 2.5. Approximately 75% $TiO_2$ was extracted. The slurry obtained by digestion was dissolved in water. Undissolved solid material containing silicates was removed completely by filtration. Titanium oxide hydrate was precipitated from the filtered solution by hydrolysis in the temperature range 375 to 390K. The titanium oxide hydrate was filtered from the solution and calcined in the temperature range 1050 to 1300K to produce pure titanium oxide.

Figure 1B:
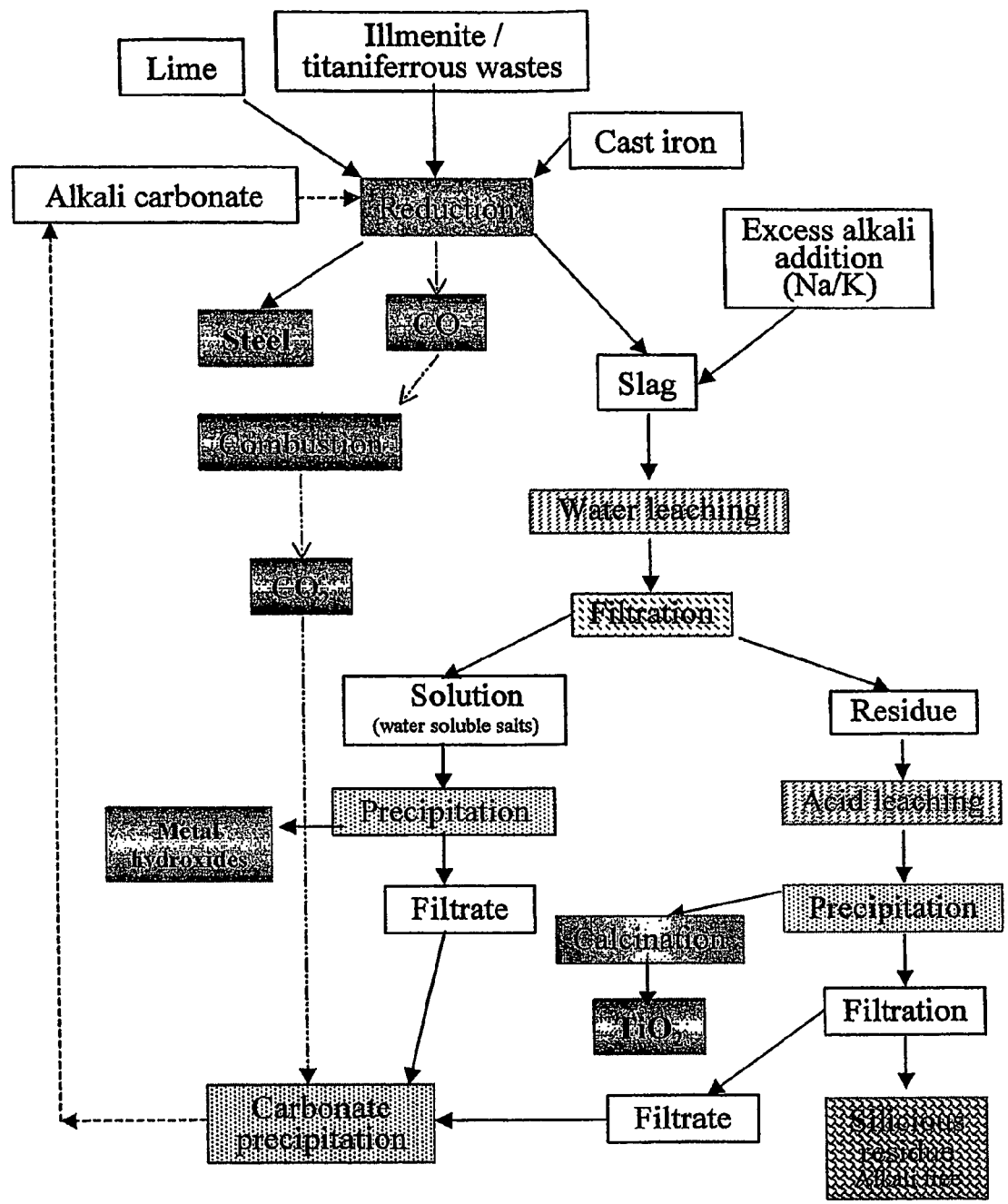
FIG. 1b illustrates schematically the process carried out on titaniferrous waste.

(FIG. 1b illustrates schematically the analogous process of Example I and FIG. 1a carried out on ilmenite or other titaniferrous waste).

EXAMPLE II

Red Mud

FIG. 1 illustrates schematically the process carried out in Example II.

Red mud (approximate composition: 46% $Fe_2O_3$, 22% of $Al_2O_3$, 8% of $TiO_2$, 8% of $SiO_2$, 3-4MgO and CaO and loss on ignition was 10-12 wt %) was charged with excess lime and carbon in a molten grey cast iron bath. Sodium/potassium carbonate (20% excess of stoichiometric ratio) was added to the slag before tapping. The experiments were carried out as described in the above example. The extraction efficiency for alumina was over 75%. Approximately 75% $TiO_2$ was extracted in the process. The residue contained complex alumino-silicates.

The red mud obtained in this case contains alkali in the form of potassium ions and does not exhibit the harmful effects of soda in red mud which cannot be used as a fertilizer or soil conditioner.

EXAMPLE III

Alkali Roasting of Ilmenite

Figure 2:
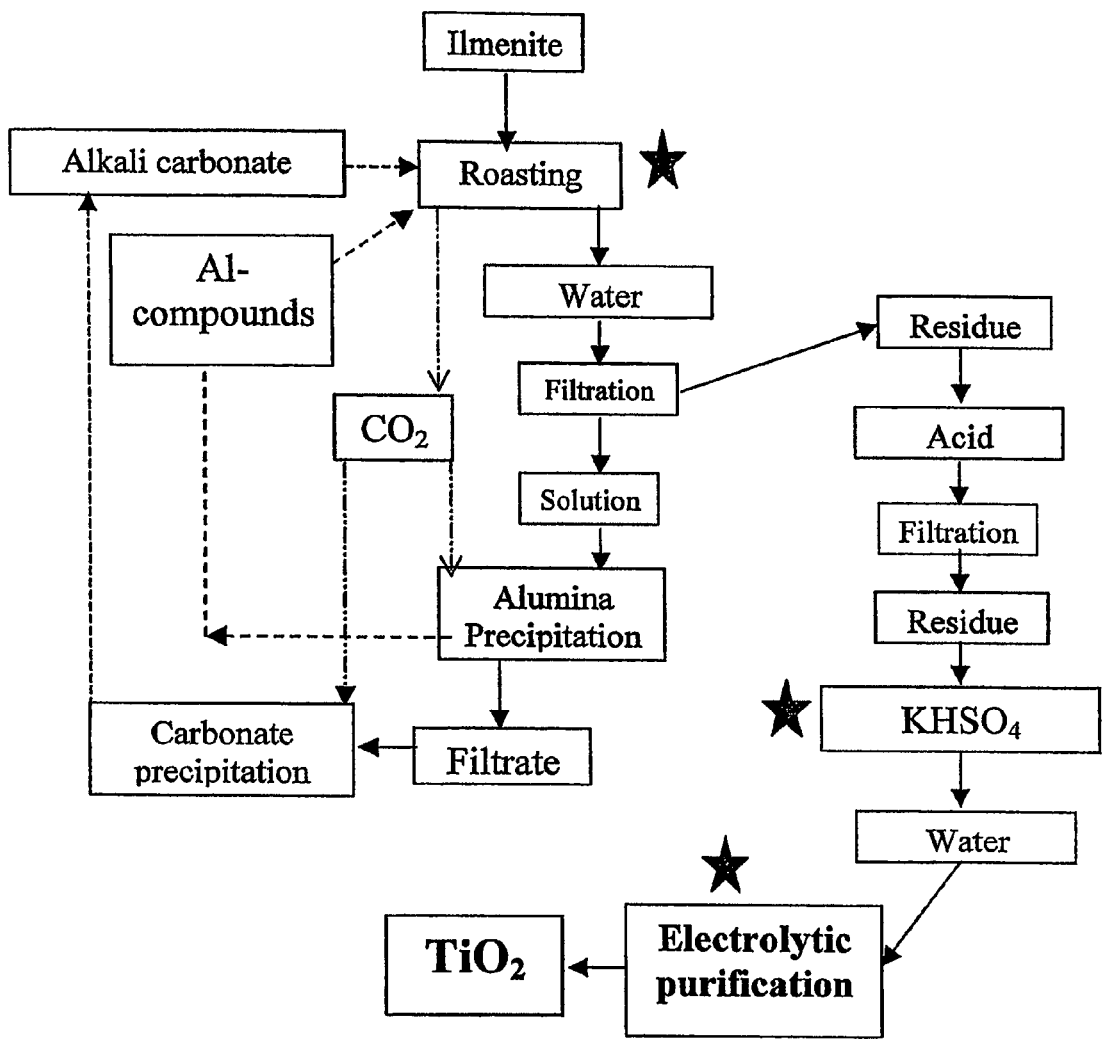
FIG. 2 illustrates schematically the process carried out in Example III.

FIG. 2 illustrates schematically the process carried out in Example III.

Ilmenite ore containing 63% $TiO_2$, 32% $Fe_2O_3$ and 2% $Al_2O_3$ was mixed with 10% alumina and excess alkali carbonate and roasted at 1200° C. for 2 hours in air. Sodium or potassium carbonate was added (20% excess to stoichiometric ratio $Na_2O:TiO_2$). The roasted mass was leached in water and the solution filtered to separate residue. The filtrate was acidified with carbon dioxide to convert water-soluble sodium/potassium aluminate into $Al(OH)_3$ precipitate. $Al(OH)_3$ was filtered out and recycled into the first step. The filtrate was evaporated and sodium carbonate was recovered. The residue containing titanium dioxide ($TiO_2$) was leached with 5% HCl solution. The residue was filtered out and washed with acid solution and then with water. Titanium dioxide concentration in the residue was increased to more than 90% at the end of the process.

EXAMPLE IV

Ilmenite Roasting Experiment

Illmenite ore (ill-1) and oxidized ilmenite (ill-oxi) ore (heat treated in air at 1200° C. for 2 hours) were roasted in air.

| Roasting conditions: | | | |
|---|---|---|---|
| Soda-ash to ore ratio: | 1:1 by wt | $NaAlO_2$ addition: 10% of ore wt. | |
| Temperature: | 900° C. | Time: 3 hours | |

Roasted samples were first leached and washed in hot water until the pH of the filtered solution reached about 7. The residue was then leached and washed in 5% HCl acid solution. The samples from each stage were dried in an oven at 100° C. for 3 hours and then analysed by XRF.

| Analysis report | | | | | | |
|---|---|---|---|---|---|---|
| Sample identification number | $TiO_2$ | $Fe_2O_3$ | $Al_2O_3$ | $Na_2O$ | Loss on Ignition | Total |
| Ill-1 | 62.29 | 31.00 | 1.18 | 0.00 | 2.35 | 99.51 |
| Ill-R-W | 44.85 | 20.14 | 0.40 | 15.85 | 9.20 | 92.67 |
| Ill-R-Al-W | 46.76 | 20.94 | 0.23 | 13.97 | 10.24 | 94.46 |
| Ill-R-Ac | 60.19 | 24.50 | 0.34 | 2.61 | 9.16 | 98.82 |
| Ill-R-Al-Ac | 69.14 | 16.34 | 0.30 | 0.81 | 10.96 | 99.40 |
| Ill-oxi | 63.51 | 30.17 | 1.27 | <0.30 | 0.00 | 98.07 |
| Ill-oxi-R-W | 46.40 | 21.89 | 0.34 | 12.69 | 12.97 | 96.92 |
| Ill-oxi-R-Al-W | 46.66 | 21.67 | 0.30 | 12.47 | 9.72 | 93.74 |
| Ill-oxi-R-Ac | 59.07 | 24.99 | 0.30 | 2.89 | 9.22 | 98.55 |
| Ill-oxi-R-Al-Ac | 72.05 | 13.55 | 0.19 | 0.87 | 10.58 | 99.13 |

| Sample identification: | Description |
|---|---|
| Ill-1: | Illmenite ore as received. |
| Ill-R-W: | Residue of illmenite ore collected after water leaching |
| Ill-R-Al-W: | Residue of illmenite ore roasted with $NaAlO_2$ collected after water leaching. |
| Ill-R-Ac: | Residue of illmenite ore collected after water and acid leaching |
| Ill-R-Al-Ac: | Residue of illmenite ore roasted with $NaAlO_2$ collected after water and acid leaching. |
| Ill-oxi-1: | Oxidized illmenite ore. |
| Ill-oxi-R-W: | Residue of oxidized illmenite ore collected after water leaching |
| Ill-oxi-R-Al-W: | Residue of oxidized illmenite ore roasted with $NaAlO_2$ collected after water leaching. |
| Ill-oxi-R-Ac: | Residue of oxidized illmenite ore collected after water and acid leaching. |
| Ill-oxi-R-Al-Ac: | Residue of oxidized illmenite ore roasted with $NaAlO_2$ collected after water and acid leaching. |

The invention claimed is:
1. A process for recovering at least one metal oxide from a titaniferrous or aluminaferrous mixture comprising:
  (A) preparing a molten slag, said molten slag is prepared by
    (A1) melting iron with a composition of cast iron into a molten cast iron bath;

(A2) adding said titaniferrous or aluminaferrous mixture to the molten cast iron bath;
(A3) smelting the titaniferrous or aluminaferrous mixture in the molten cast iron bath to produce a molten slag,
whereby the iron present in the titaniferrous or aluminaferrous mixture is reduced to molten steel in the molten slag;
(B) adding to the molten slag an alkali metal carbonate;
(C) isolating molten iron from the molten slag to produce a residual slag; and
(D) recovering the at least one metal oxide from the residual slag, wherein the at least one metal oxide is one or more of $Al_2O_3$, $TiO_2$, $Fe_2O_3$, and $SiO_2$.

2. The process of claim 1 wherein the titaniferrous mixture is ilmenite, rutile or perovskite.

3. The process of claim 1 wherein the aluminaferrous mixture is an aluminum mineral, aluminum ore, or red mud.

4. The process of claim 3 wherein the aluminaferrous mixture is bauxite or red mud.

5. The process of claim 1 further comprising: recovering one or more metal hydroxides.

6. The process of claim 1 wherein the at least one metal oxide is at least two metal oxides being $TiO_2$ and $Al_7O_3$.

7. The process of claim 1 wherein the steel composition includes 0.8 to 1.0% C.

8. The process of claim 1 wherein step (A3) further comprises smelting the mixture in the presence of lime.

9. The process of claim 1 wherein the carbonate is selected from the group consisting of sodium carbonate and potassium carbonate.

10. The process of claim 1 wherein the titaniferrous mixture is ilmenite and step (A3) comprises smelting the mixture in the presence of up to 50%, by stoichiometric proportion, of either (a) a mixture of alkali/alumina or (b) sodium aluminate.

11. The process of claim 1 wherein in step (C), the molten iron and residual slag are tapped separately.

12. The process of claim 11 wherein during tapping of residual slag, alkali is added to the residual slag by dosing.

13. The process of claim 1 wherein step (D) comprises: (D1) adding to the residual slag an aqueous solution; (D2) separating a metallate solution from a metallate residue; and (D3) isolating the metal oxide from the metallate solution and/or from the metallate residue.

14. The process of claim 13 wherein step (D3) comprises: (D3a) precipitating metal hydroxide from the metallate solution.

15. The process of claim 14 wherein step (D3a) includes: bubbling $CO_2$ gas through the metallic solution.

16. The process of claim 15 wherein the $CO_2$ gas is generated during step (A).

17. The process of claim 13 wherein step (D3) comprises: (D3b) acid leaching the metallate residue to produce an acid leachate; (D3c) selectively precipitating from the acid leachate a hydrated salt of the metal oxide; and (D3d) converting the hydrated salt into the metal oxide.

18. The process of claim 17 wherein step (D3b) comprises: (D3b1) acidifying the metallate residue to produce a slurry; (D3b2) hydrolysing the slurry; and (D3b3) separating the metallate solution from an insoluble residue.

* * * * *

UNITED STATES PATENT AND TRADEMARK OFFICE
CERTIFICATE OF CORRECTION

PATENT NO.        : 8,834,600 B2                                    Page 1 of 1
APPLICATION NO.   : 10/560515
DATED             : September 16, 2014
INVENTOR(S)       : Animesha Jha et al.

It is certified that error appears in the above-identified patent and that said Letters Patent is hereby corrected as shown below:

In the Claims:
Column 9, line 24: Delete "$Al_7O_3$" and replace with -- $Al_2O_3$ --

Signed and Sealed this
Second Day of December, 2014

Michelle K. Lee
*Deputy Director of the United States Patent and Trademark Office*